United States Patent [19]

Hashimoto et al.

[11] Patent Number: 5,184,590

[45] Date of Patent: Feb. 9, 1993

[54] ENGINE TIMING CONTROL APPARATUS

[75] Inventors: Atsuko Hashimoto; Toshio Iwata; Wataru Fukui, all of Himeji, Japan

[73] Assignee: Mitsubishi Denki Kabushiki Kaisha, Tokyo, Japan

[21] Appl. No.: 832,839

[22] Filed: Feb. 10, 1992

[30] Foreign Application Priority Data

| Feb. 12, 1991 | [JP] | Japan | 3-038903 |
| Feb. 13, 1991 | [JP] | Japan | 3-040481 |
| Feb. 13, 1991 | [JP] | Japan | 3-040482 |
| Feb. 15, 1991 | [JP] | Japan | 3-022198 |

[51] Int. Cl.$^5$ ............................ F02P 5/15; F02P 7/067
[52] U.S. Cl. ................................... 123/414; 123/417
[58] Field of Search ............... 123/414, 416, 417, 478, 123/480, 612, 617; 73/116, 117.3; 364/431.04, 431.05

[56] References Cited

U.S. PATENT DOCUMENTS

| 4,355,613 | 10/1982 | Rode et al. | 123/417 X |
| 4,553,426 | 11/1985 | Capurka | 123/414 X |
| 4,553,427 | 11/1985 | Kuraoka et al. | 123/414 X |
| 4,787,354 | 11/1988 | Wilens et al. | 123/417 X |
| 4,797,827 | 1/1989 | Cockerham | 123/414 X |
| 4,807,137 | 2/1989 | Kluppel et al. | 123/416 |
| 4,899,281 | 2/1990 | Grimaud et al. | 123/417 X |
| 5,041,979 | 8/1991 | Hirka et al. | 123/414 X |

Primary Examiner—Tony M. Argenbright
Attorney, Agent, or Firm—Sughrue, Mion, Zinn, Macpeak and Seas

[57] ABSTRACT

An engine timing control apparatus has a crankshaft position sensor that generates an output signal in the form of a series of pulses having gaps at regular intervals, the gaps indicating reference positions of the crankshaft. The crankshaft position sensor is mounted on an engine such that ignition of the engine does not occur during any of the gaps. A microcomputer controls the engine timing based on the reference positions.

7 Claims, 12 Drawing Sheets

ENGINE TIMING CONTROL APPARATUS

BACKGROUND OF THE INVENTION

This invention relates to an apparatus for controlling the timing, and particularly the ignition timing, of an internal combustion engine. More particularly, it relates to an engine timing control apparatus which is less susceptible to engine noise than conventional timing control apparatuses.

An engine timing control apparatus typically includes a signal generator for generating an output signal indicating a prescribed reference position of the crankshaft of an engine. The ignition timing, the fuel injection timing, and the time at which the ignition coil is made to begin conducting are measured from this reference position, so it is very important to detect the reference position accurately. A common type of signal generator for engine control is a crankshaft position sensor which generates a pulse train having gaps of a prescribed length therein at regular intervals. The gaps in the pulse train identify the occurrence of the reference position.

At the time of ignition in an engine, much electrical noise is generated. In a conventional engine timing control apparatus, the gaps in the pulse train generated by the signal generator coincide in time with ignition, and the electrical noise produced by ignition can make it difficult to identify the gaps. Therefore, the reference positions corresponding to the gaps can not be detected, and the engine timing can not be accurately controlled.

SUMMARY OF THE INVENTION

Accordingly, is an object of the present invention to provide an engine timing control apparatus which is less susceptible to electrical noise produced during ignition than conventional engine timing control apparatus.

It is another object of the present invention to provide an engine timing control apparatus which has a simple structure.

It is yet another object of the present invention to provide an engine timing control apparatus which can reduce the load on a microcomputer used in the apparatus.

An engine timing control apparatus according to the present invention includes a signal generator for generating a signal having a discontinuous portion indicating a prescribed reference position of the crankshaft of an engine and ignition control means for controlling the ignition timing of the engine based on the reference position. The signal generator is arranged so that the discontinuous portion does not coincide with the ignition timing.

In preferred embodiments, the signal generator comprises a crankshaft position sensor that senses the rotation of a crankshaft and generates an output signal in the form of a series of pulses having a gap formed therein at regular intervals. The gap indicates the occurrence of a prescribed reference position of the crankshaft. The crankshaft position sensor is mounted on an engine in a location such that the ignition timing does not occur during the gaps. As a result, electrical noise accompanying ignition does not affect the sensing of the gaps, so the reference position indicated by the gaps can be accurately sensed. Based on the reference position, the engine timing can be accurately controlled.

DESCRIPTION OF THE PREFERRED EMBODIMENTS

Figure 1:
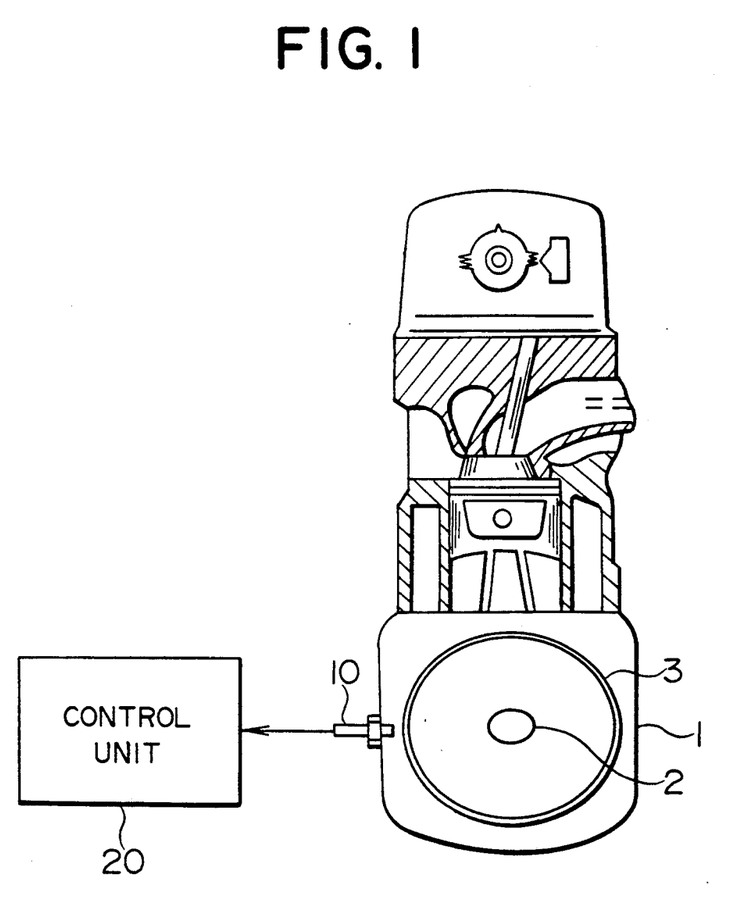
FIG. 1 is a schematic elevation of an engine equipped with a first embodiment of the present invention.

A number of preferred embodiments of the present invention will now be described while referring to the accompanying drawings. FIG. 1 schematically illustrates a multi-cylinder internal combustion engine 1 equipped with a first embodiment of the present invention. The engine 1 may have any number of cylinders, but the case will be described it which it is a four-cycle, four-cylinder engine.

The engine 1 has a crankshaft 2 on which a flywheel 3 is mounted. The rotational angle of the crankshaft 2 is detected by a signal generating means in the form of a conventional crankshaft position sensor 10 mounted on the engine 1 near the periphery of the flywheel 3. The crankshaft position sensor 10 generates an output signal in the form of a crankshaft position signal indicating when the crankshaft 2 is at a prescribed rotational position. This output signal, which will be referred to as the POS signal, is input to a control unit 20 which calculates the timing of an engine control parameter, such as the ignition timing or the conducting times of an unillustrated ignition coil for the engine 1.

Figure 2:
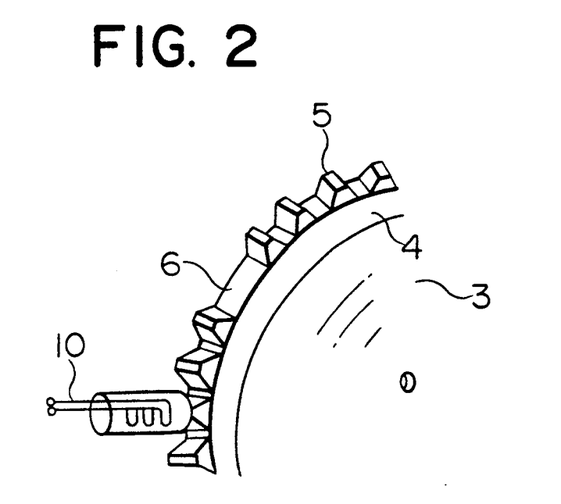
FIG. 2 is a perspective view of a portion of the flywheel and the crankshaft position sensor of FIG. 1.
Figure 3:
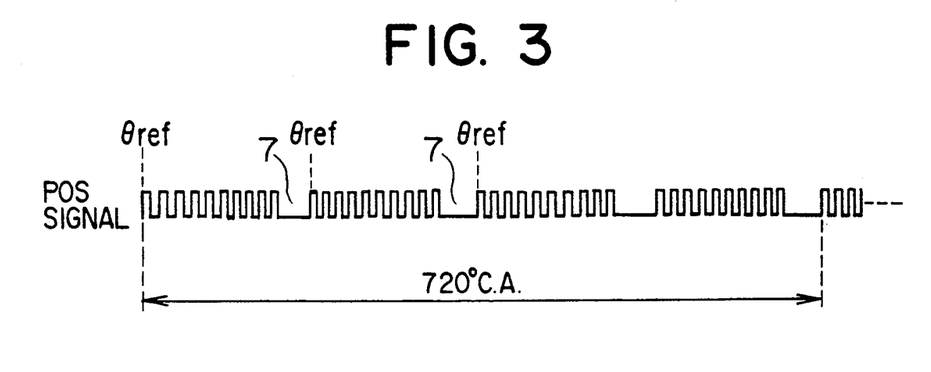
FIG. 3 is a waveform diagram of the output signal of the crankshaft position sensor of FIG. 2.

FIG. 2 illustrates the flywheel 3 and the crankshaft position sensor 10 in greater detail, while FIG. 3 is a waveform diagram of the POS signal output by the crankshaft position sensor 10. The flywheel 3 has a ring gear 4 secured to its periphery. The ring gear 4 has a plurality of teeth 5 disposed at uniform intervals around the circumference of the ring gear 4, but at a plurality of locations on the ring gear 4, there are gaps 6 between adjacent teeth, the gaps 6 being wider in the circumferential direction than the normal separation between adjacent teeth 5. The number of gaps 6 is normally equal to the number of cylinders of the engine that fire in a single rotation of the crankshaft, so on a flywheel 3 for a four-cycle, four-cylinder engine, there are two gaps 6 in the ring gear 4 separated by 180 degrees. When the crankshaft position sensor 10 is disposed in the vicinity of the ring gear 4 and the flywheel 3 and the ring gear 4 are rotated, the crankshaft position sensor 10 generates a pulse corresponding to each tooth of the ring gear 4. The period of the pulses, measured in degrees of crankshaft rotation, is determined by the width of and separation between the teeth 5 of the ring gear 4. A typical value for the period is 2 degrees, but the exact value is not critical. When the gap 6 in the ring gear 4 passes by the crankshaft position sensor, the POS signal has a corresponding gap 7, as shown in FIG. 3. A portion of this gap 7, such as the rising edge of a pulse immediately following the gap 7, identifies a reference position $\theta_{ref}$ corresponding to a prescribed rotational angle of the crankshaft 2.

Figure 4:
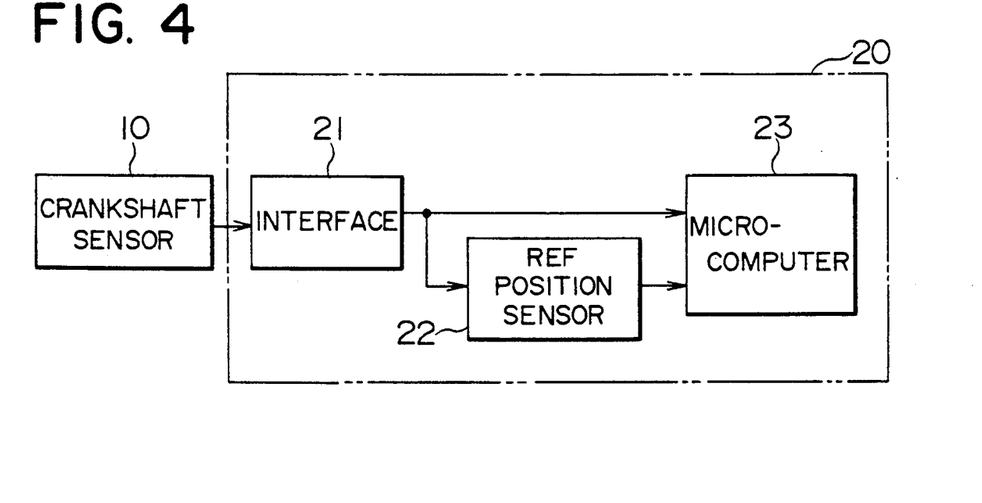
FIG. 4 is a block diagram of the control unit of FIG. 1.

FIG. 4 is a block diagram of the control unit 20 of FIG. 1. It includes an interface 21 which performs waveform shaping of the POS signal from the crankshaft position sensor 10 and provides the processed signal to a reference position sensor 22 and a microcomputer 23. The reference position sensor 22 detects the reference position $\theta_{ref}$ by measuring the period of the pulses in the POS signal. When it detects the reference position $\theta_{ref}$, it generates an output signal (referred to as a reference signal), which is provided to the microcomputer 23. The microcomputer 23 then controls the ignition timing using the reference signal as a reference.

The operation of the control unit 20 will be described while referring to the waveform diagrams in FIG. 5. As shown by the first line in FIG. 5, the POS signal comprises pulses of uniform period having gaps 7 every 180 degrees. In the present embodiment, the reference position sensor includes an unillustrated counter which counts the number of output pulses of an unillustrated clock occurring between the rising edges of consecutive pulses of the POS signal. As shown in the second line of FIG. 5, upon each rising edge of the POS signal, the counter is reset to zero. When the value reached by the counter exceeds a prescribed reference value, the reference position sensor 22 generates a reference signal, shown by the third line in FIG. 5, coinciding with the rising edge of the pulse immediately following the gap 7. The threshold level is selected so that the counter value exceeds the threshold only during one of the gaps 7 in the POS signal. The reference position sensor need not employ a counter, and other ways of sensing the gaps 7 are possible.

Upon receiving the reference signal from the reference position sensor 22, the microcomputer 23 begins counting the pulses of the POS signal until the crankshaft 2 has rotated from the reference position $\theta_{ref}$ by a prescribed angle $\theta_B$. An unillustrated internal timer in the microcomputer 23 then begins timing for a predetermined length of time Ta. When period Ta elapses, ignition is carried out by cutting off the primary winding current in an ignition coil, which began conducting some time earlier. The current in the primary winding of the ignition coil is shown in the bottom line of FIG. 5.

If the reference position $\theta_{ref}$ is at 75° BTDC, the target ignition timing is a crankshaft angle $\theta_A$, and T is the period between consecutive occurrences of the reference position (i.e., the length of time required for the crankshaft to rotate by 180°), then the length of the period Ta is expressed by the following equation:

$$Ta = (75° - \theta_A - \theta_B) \times T/180° \quad (1)$$

Figure 6:
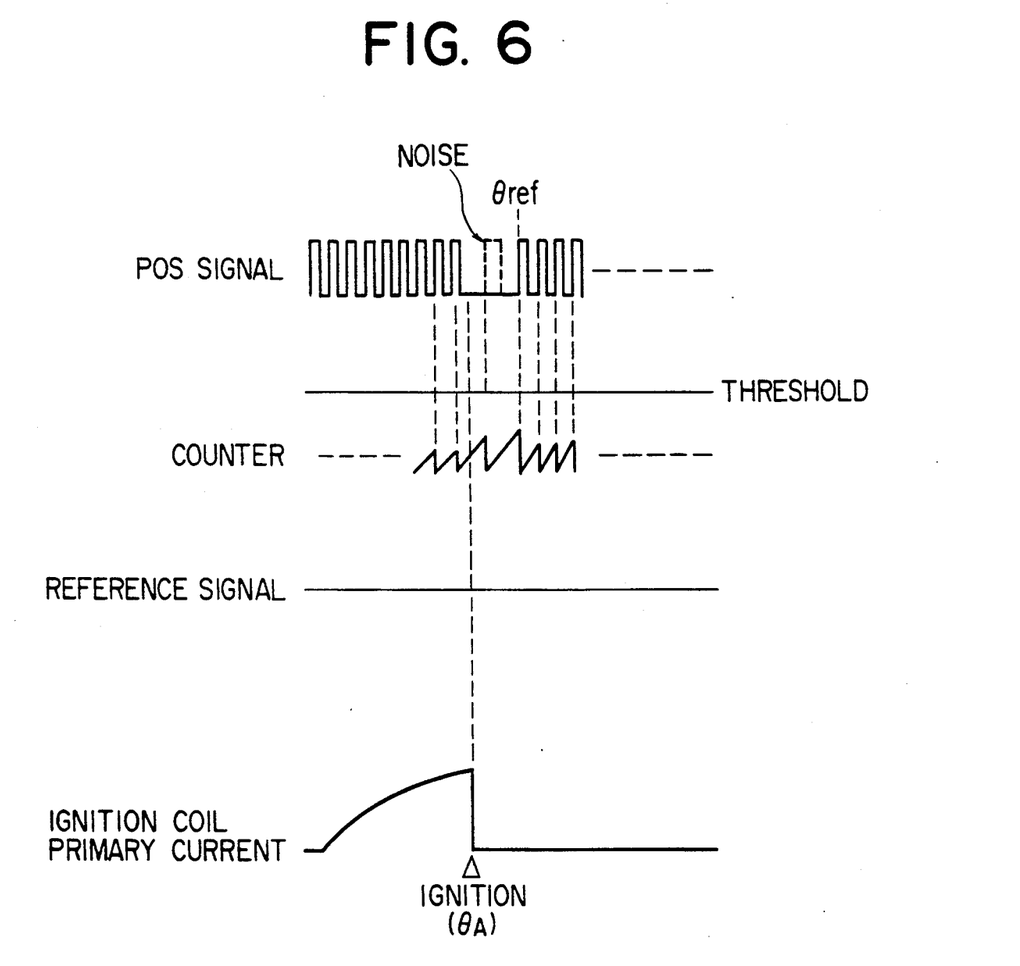
FIG. 6 is a waveform diagram showing the operation of the control unit when the ignition timing coincides with the gap in the POS signal.

The crankshaft position sensor 10 is preferably mounted on the engine 1 in a position such that the ignition timing $\theta_A$ does not occur during one of the gaps 7 in the POS signal. The reason for this is made clear from FIG. 6, which is a waveform diagram illustrating what could happen if the ignition timing $\theta_A$ coincided with one of the gaps 7 in the POS signal. At the time of ignition, much electrical noise is generated. If this electrical noise occurs during the gap 7, it can be mistaken by the reference position sensor for a pulse in the POS signal. The dashed line in the top line in FIG. 6 represents noise due to ignition occurring during the gap 7. If the reference position sensor 22 mistakes this noise for a pulse of the POS signal, the counter in the reference position sensor 22 will be reset by the noise pulse, and the counter value will not exceed the threshold. Therefore, the reference position sensor 22 will not generate a reference signal. Since the microcomputer 23 does not receive a reference signal, it can not control the ignition timing based on the reference position, so accurate control of the engine can not be performed.

In contrast, in the embodiment of FIGS. 1-5, since ignition does not occur during the gap 7 in the POS signal, there is no possibility of the reference position sensor 22 failing to sense the reference position. Therefore, the ignition timing can be accurately controlled based on the reference position.

The reference position $\theta_{ref}$ is preferably set to be in advance of the earliest possible ignition timing. In the embodiment of FIG. 5, the reference position $\theta_{ref}$ is set at 75° BTDC, but it can be set as desired so long as none of the gaps 7 coincide with the ignition timing of any of the cylinders of the engine.

Figure 5:
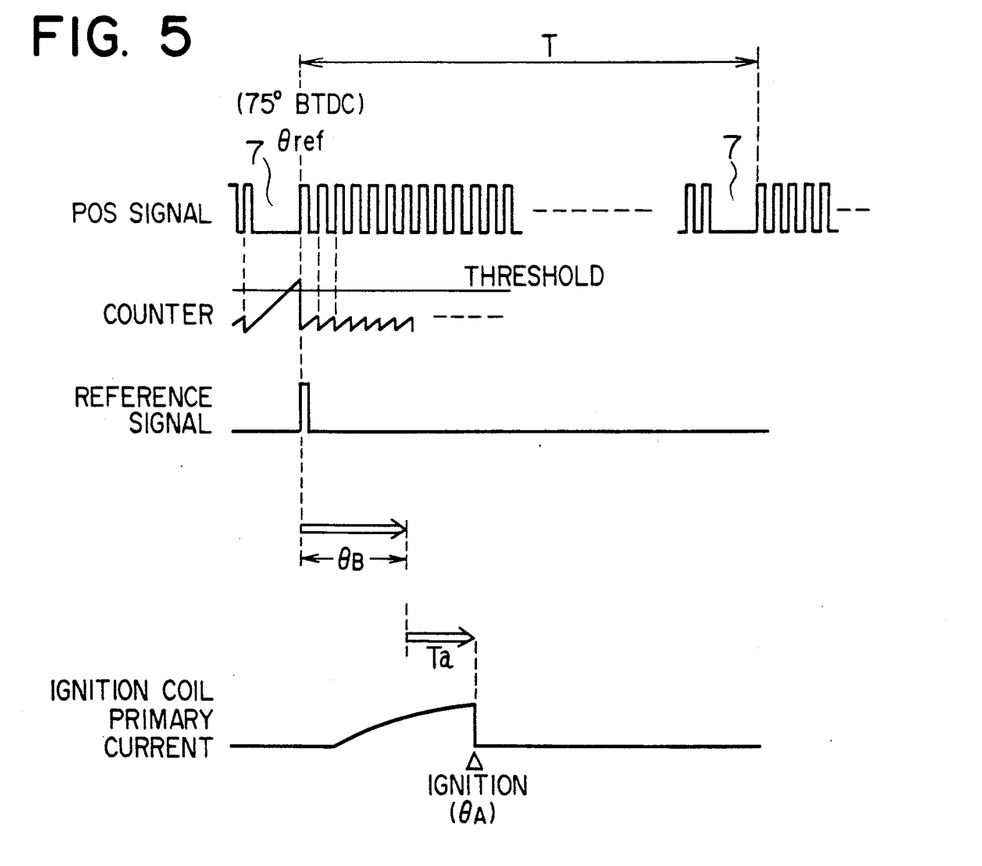
FIG. 5 is a waveform diagram showing the operation of the control unit of FIG. 1.

In the mode of operation illustrated in FIG. 5, the microcomputer 23 determines that the crankshaft has reached the rotational angle corresponding to the ignition timing by counting a prescribed number of pulses of the POS signal from the reference position $\theta_{ref}$ and then timing for a prescribed length of time Ta. Alternately, the ignition timing $\theta_A$ can be controlled solely by counting pulses of the POS signal from the reference position $\theta_{ref}$ until the crankshaft 2 has rotated by a prescribed number of degrees, or it can be controlled solely by measuring a predetermined period of time from the occurrence of the reference position $\theta_{ref}$. However, a method involving counting pulses of the POS signal from the reference position $\theta_{ref}$ until the ignition timing $\theta_A$ has the disadvantage that the ignition timing can only be controlled with a resolution equal to the period of the pulses of the POS signal. On the other hand, a method in which the microcomputer 23 determines that the ignition timing $\theta_A$ has been reached by timing from the reference position $\theta_{ref}$ for a prescribed length of time has the disadvantage that fluctuations in the rotational speed of the engine between the occurrence of the reference position $\theta_{ref}$ and the occurrence of the ignition position can cause the actual ignition timing to deviate from the target ignition timing. The method illustrated in FIG. 4 in which the microcomputer 23 counts a prescribed number of pulses corresponding to crankshaft rotation by an angle $\theta_B$ and then times for a prescribed length of time Ta enables the ignition timing to be controlled with any desired resolution, and since the length of the time period Ta can be made very short, the effect on the ignition timing of fluctuations in the engine rotational speed is minimized.

The reference position sensor 22 is illustrated as being external to the microcomputer 23, but it can instead be incorporated into the microcomputer 23.

The target ignition timing $\theta_A$ can be calculated by a control unit external to the microcomputer 23 and be provided to the microcomputer 23 as an input signal, or it can be calculated by the microcomputer 23 itself. Algorithms for calculating a target ignition timing based on engine operating conditions are well known to those skilled in the art.

The microcomputer 23 can be used to directly control an igniter for spark plugs of the engine, or it can provide a control signal to a separate control unit which carries out ignition.

The microcomputer 23 was described as controlling the ignition timing. However, in a similar manner, the microcomputer 23 can be used to determine the occurrence of the crankshaft angle at which an unillustrated ignition coil for the engine 1 begins conducting.

Figure 7:
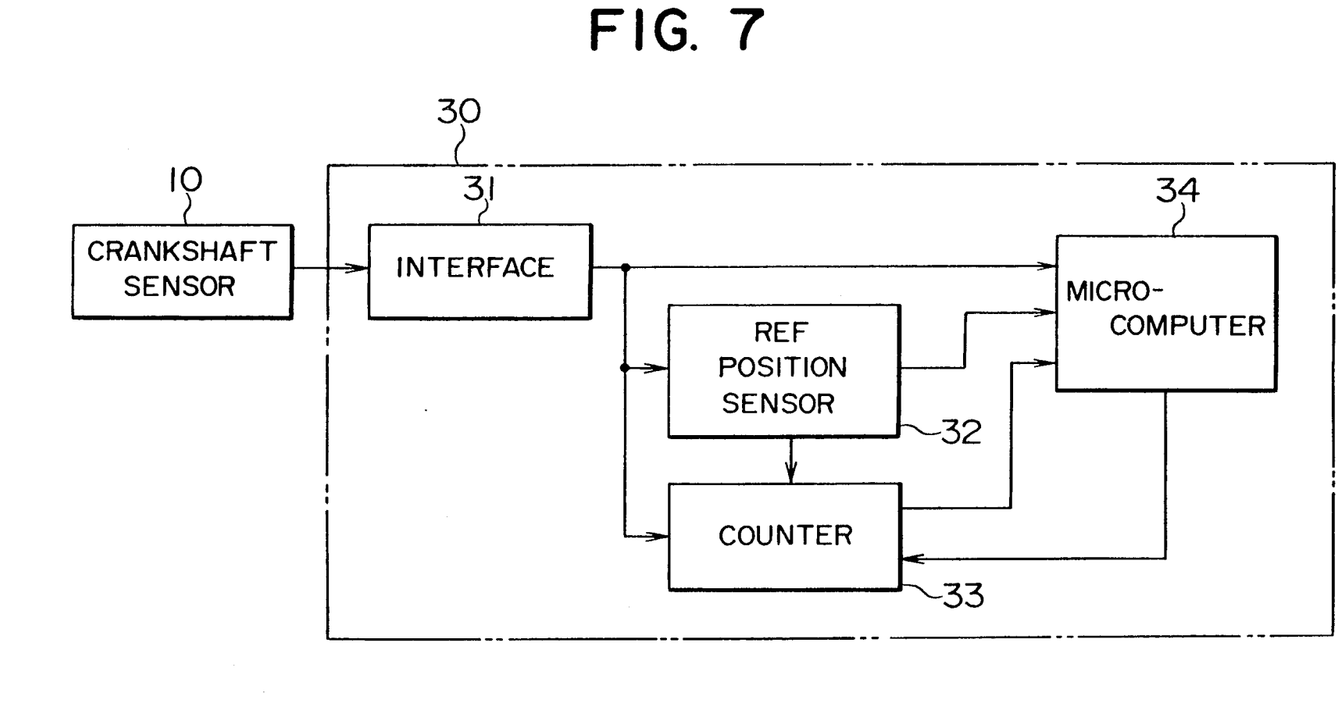
FIG. 7 is a block diagram of a control unit of a second embodiment of the present invention.

FIG. 7 is a block diagram of a control unit 30 of a second embodiment of the present invention. Like the first embodiment, it includes an interface 31 which receives a crankshaft position signal (a POS signal) from a crankshaft position sensor 10 mounted on an engine 1 in the same manner as in FIG. 1. The interface 31 performs waveform shaping of the POS signal and provides the shaped signal to a reference position sensor 32, a resettable counter 33, and a microcomputer 34. The reference position sensor 32 corresponds to the reference position sensor 22 of FIG. 2 and operates in a similar manner. It provides an output signal (a reference signal) to the microcomputer 34 and to the counter 33 upon the occurrence of the reference position $\theta_{ref}$. The purpose of the counter 33 is to detect the occurrence of prescribed crankshaft angles $\theta_1$ and $\theta_2$ occurring subsequent to the reference position $\theta_{ref}$ and provide the microcomputer 34 with an input signal indicating the occurrence of these crankshaft angles. The microcomputer 34 determines when the crankshaft is at the target ignition timing $\theta_A$ in the same manner as in the previous embodiment, and in addition it performs calculations to determine the pressure within the cylinders of the engine and the occurrence of misfiring based on the input signals from the counter 33. The structure of this embodiment is otherwise similar to that of the first embodiment.

Figure 8:
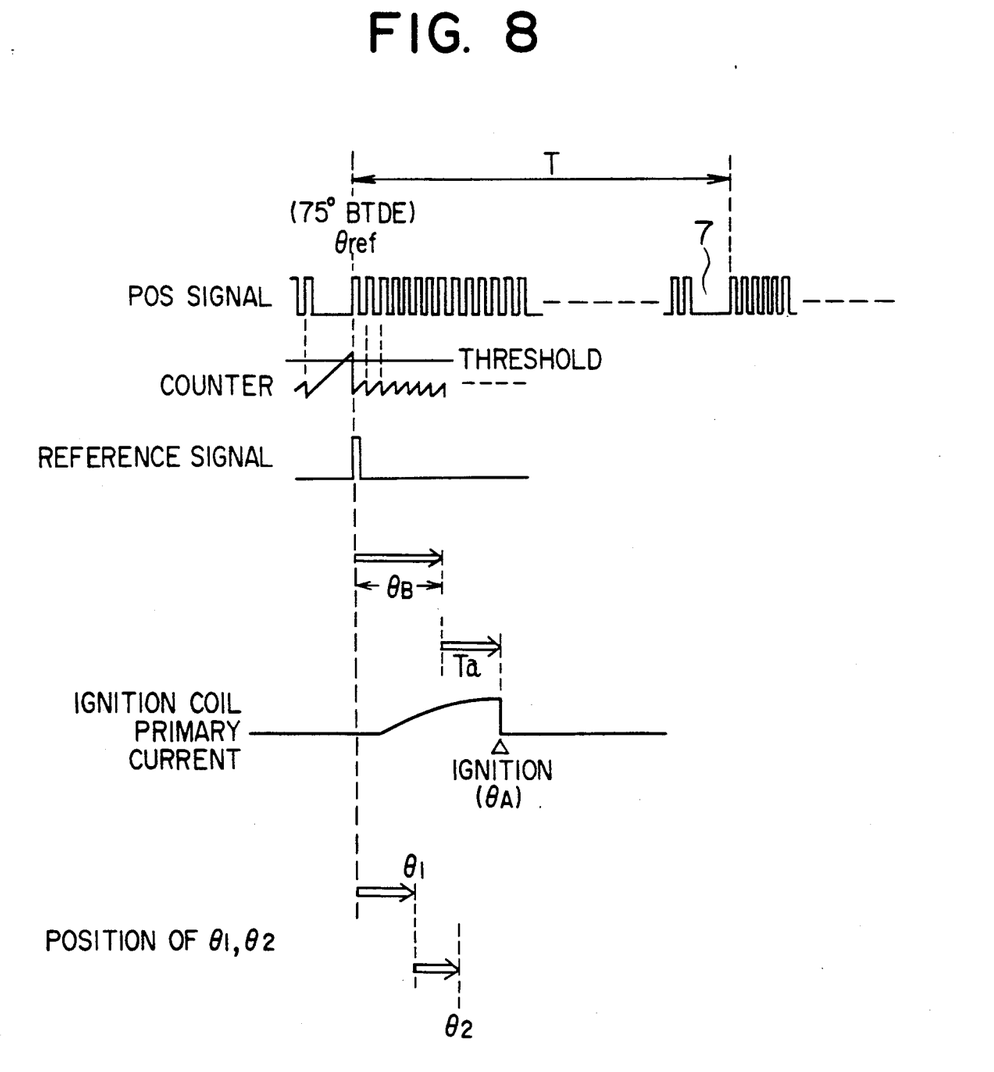
FIG. 8 is a waveform diagram showing the operation of the control unit of FIG. 7.

The operation of the control unit 30 of FIG. 7 will be described while referring to the waveform diagrams of FIG. 8. FIG. 8 illustrates, from top to bottom, the POS signal from the crankshaft position sensor 10, the output of an internal counter of the reference position sensor 32, the reference signal generated by the reference position sensor 32, the primary winding current of an unillustrated ignition coil, and the timing of the crankshaft angles $\theta_1$ and $\theta_2$. In the same manner as described with respect to FIGS. 1–5, the reference position sensor 32 identifies the reference position $\theta_{ref}$ by determining when the value of an internal counter of the reference position sensor 32 exceeds a threshold and generates a reference signal identifying the reference position $\theta_{ref}$ at the rising edge of a pulse immediately following the gap 7 in the POS signal. Upon receiving the reference signal, the microcomputer 34 counts a prescribed number of pulses of the POS signal until the crankshaft has rotated by an angle $\theta_B$ from the reference position $\theta_{ref}$, and then it times for a prescribed length of time Ta defined by Equation (1). When Ta has elapsed, ignition is carried out in the same manner as in the preceding embodiment.

When the reference position sensor 32 identifies the reference position $\theta_{ref}$, it provides the counter 33 with an input signal which resets the counter 33, and the counter 33 begins counting the pulses of the POS signal from the reference position $\theta_{ref}$ until it reaches a prescribed count corresponding to crankshaft rotation from the reference position $\theta_{ref}$ to a first prescribed crankshaft angle $\theta_1$. The number of pulses corresponding to the angle between the reference position $\theta_{ref}$ and $\theta_1$ is set in the counter 33 in advance by the microcomputer 34. When the counter 33 reaches the preset count, it generates an output signal that is provided to the microcomputer 34, indicating the occurrence of the first prescribed angle $\theta_1$. The microcomputer 34 then presets the counter 33 to a value corresponding to the rotational angle between $\theta_1$ and $\theta_2$. When the counter reaches the preset value, it generates an output signal that is provided to the microcomputer 34, indicating the occurrence of the second prescribed angle $\theta_2$. Based on the input signals provided to the microcomputer 34 at crankshaft angles $\theta_1$ and $\theta_2$, the microcomputer 34 determines the combustion state of the engine 1. For example, the microcomputer 34 can measure the internal pressure of a cylinder of the engine 1 at both crankshaft angles $\theta_1$ and $\theta_2$. The difference between the pressures at these two angles indicates the combustion state of the engine 1. The microcomputer 34 can also sense misfiring of the engine by measuring the length of time elapsing between the two angles $\theta_1$ and $\theta_2$, the length of time increasing when a cylinder of the engine is misfiring. Methods of determining the combustion state and of sensing misfiring using two crankshaft angles are well known to those skilled in the art.

The embodiment of FIGS. 7–8 has the advantage that it employs only a single counter to count to two different values and is therefore simple in structure. There are various methods, in addition to that described above, by which a single counter 33 can be used to count to two different values and thereby sense two crankshaft angles $\theta_1$ and $\theta_2$. For example, the counter 33 can be one which counts down from a preset value and generates an output signal upon reaching a count of zero. In this case, at the time of receiving the reference signal, the microcomputer 34 can preset the counter 33 to a value $\theta_1/\Delta\theta$, wherein $\Delta\theta$ is the period measured in degrees of crankshaft rotation of the pulses of the POS signal. Upon being preset, the counter 33 begins counting down from the preset value, and when it reaches 0 at angle $\theta_1$, it generates a signal which is provided to the microcomputer 34. The microcomputer 34 than presets the counter 33 to a value $\iota_1/\Delta\iota$, and the counter 33 again begins counting down. When the counter 33 again reaches a count of 0, it provides the microcomputer 34 with an input signal indicating that the second prescribed crankshaft angle $\theta_2$ has been reached.

Figure 9:
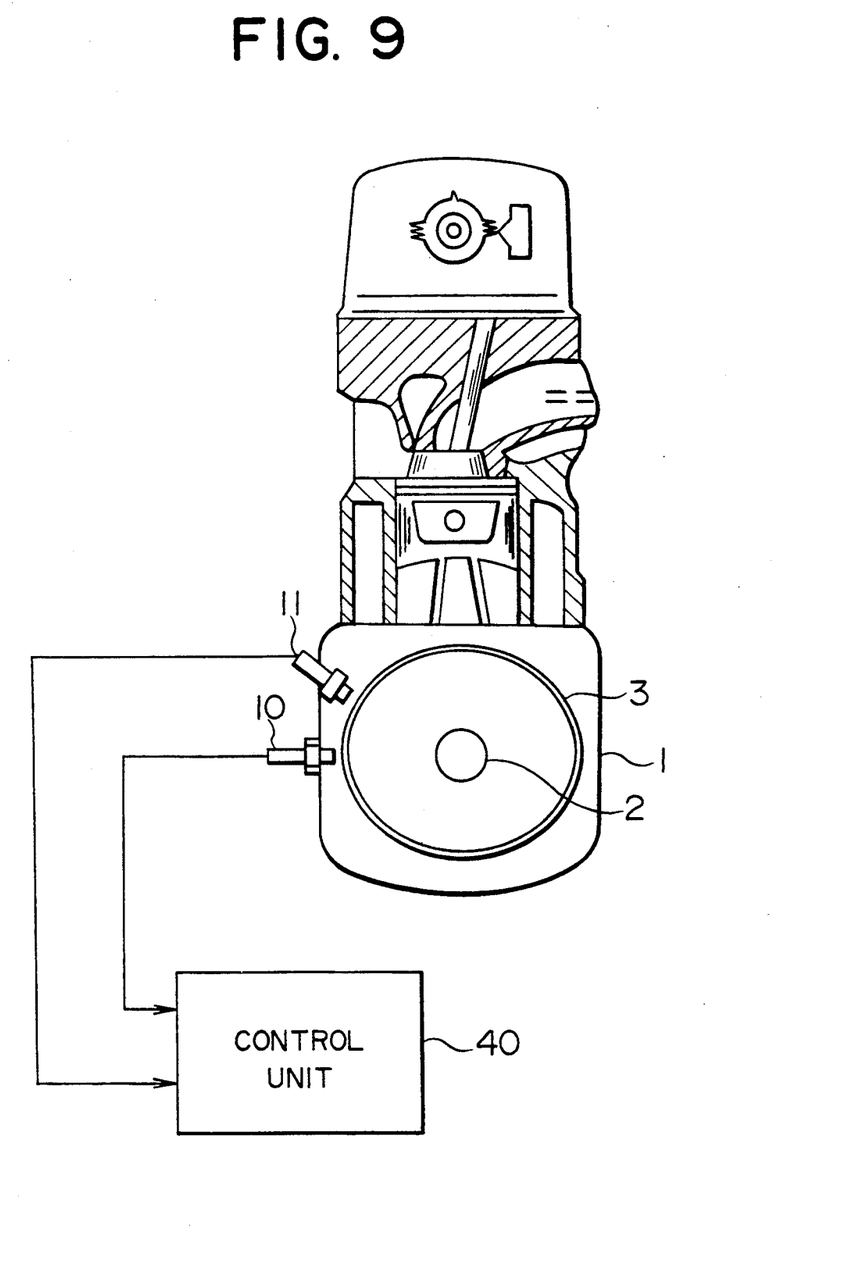
FIG. 9 is a schematic elevation of an engine equipped with a third embodiment of the present invention.
Figure 10:
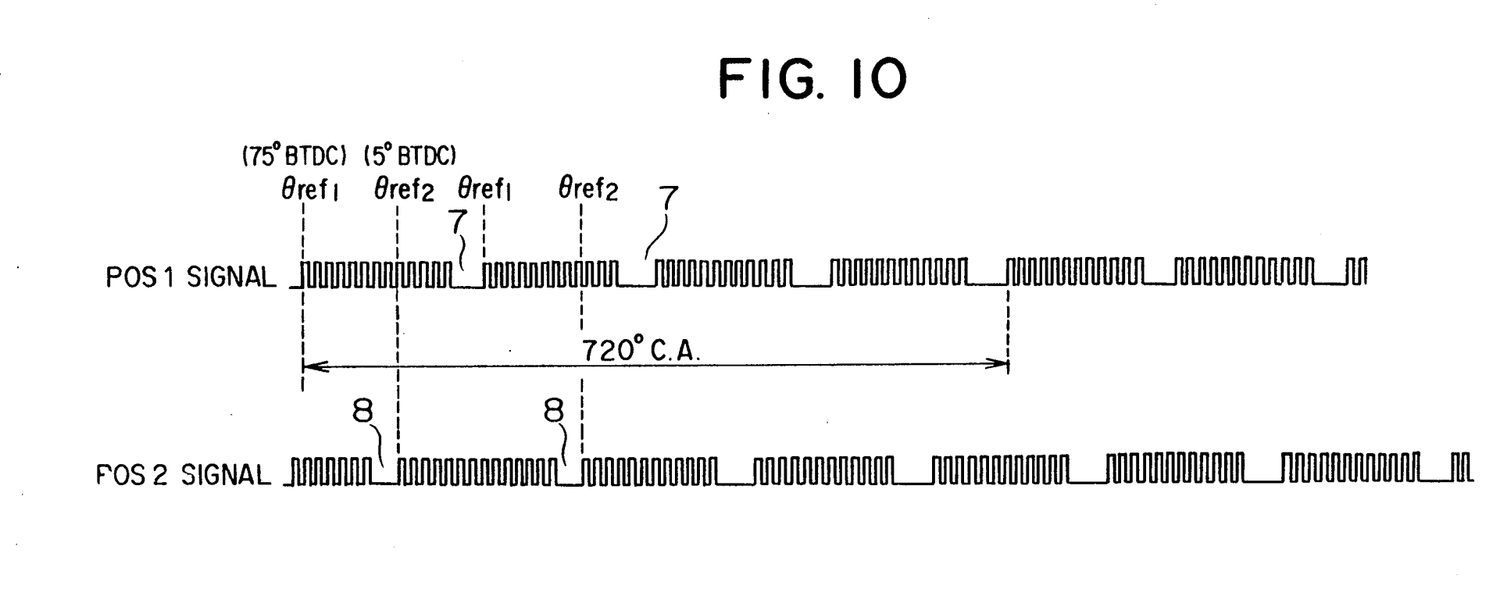
FIG. 10 is a waveform diagram of the output signals of the crankshaft position sensors of FIG. 9.

FIG. 9 is a schematic view of an engine 1 equipped with a third embodiment of the present invention. This embodiment includes a first crankshaft position sensor 10 corresponding to the crankshaft position sensor 10 of FIG. 1 and a second crankshaft position sensor 11 mounted on the engine 1 at a different angular position from the first crankshaft position sensor 10. The first and second crankshaft position sensors 10 and 11 respectively generate a first crankshaft position signal (referred to as POS1) and a second crankshaft position signal (referred to as POS2) which are input to a control unit 40. FIG. 10 is a waveform diagram of the POS1 signal and the POS2 signal. The POS1 signal is identical to the POS signal illustrated in FIG. 3, and the POS2 signal generated by the second crankshaft position sensor 11 is identical to the POS1 signal except that the periodic gap 8 in the POS2 signal occurs at a different crankshaft angle than the gap 7 in the POS1 signal. This is due to the fact that the two crankshaft position sensors 10 and 11 are mounted on different positions of the engine 1. The rising edge of a pulse immediately following the gap 7 in the POS1 signal indicates a first reference position $\theta_{ref1}$ of the crankshaft 2, while the rising edge of the pulse immediately following the gap 8 in the POS2 signal indicates a second reference position $\theta_{ref2}$ of the crankshaft 2. In the present embodiment, the first reference position $\theta_{ref1}$ corresponds to 75° BTDC and the second reference position $\theta_{ref2}$ corresponds to 5° BTDC, but the exact values of the reference positions are not critical. The first reference position $\theta_{ref1}$ is preferably chosen such that ignition does not occur during the gap 7 in the POS1 signal. The first reference position $\theta_{ref1}$ is used as a reference for controlling the ignition timing of the engine, and the second reference position $\theta_{ref2}$ is used as a reference for controlling the timing at which an unillustrated ignition coil of the engine 1 begins conducting.

Figure 11:
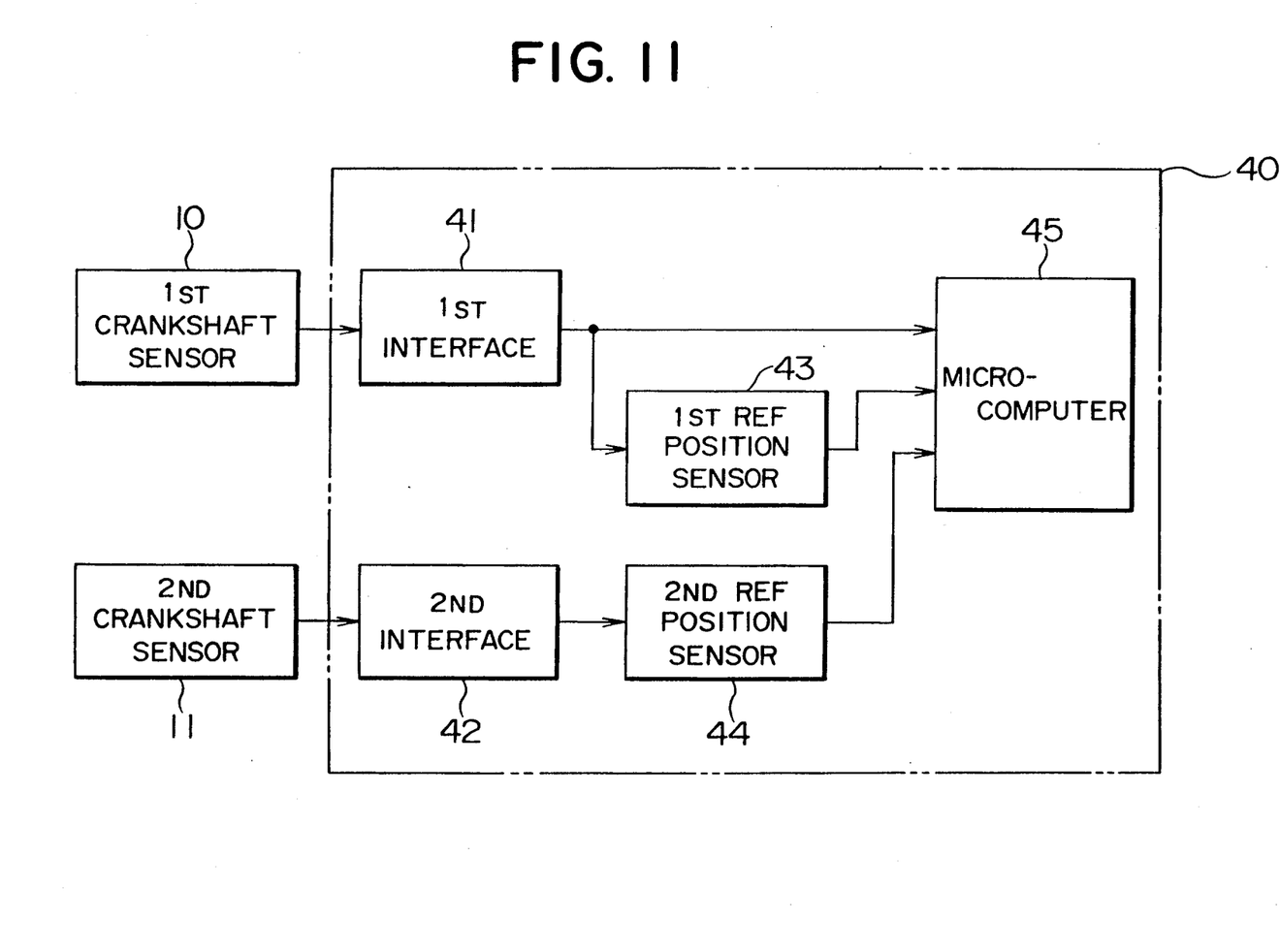
FIG. 11 is a block diagram of the control unit of FIG. 9.

FIG. 11 is a block diagram of the control unit 40 of FIG. 9. It includes a first interface 41 which receives the POS1 signal from the first crankshaft position sensor 10 and a second interface 42 which receives the POS2 signal from the second crankshaft position sensor 11. The interfaces 41 and 42 perform waveform shaping of the input signals and provide shaped output signals to a first reference position sensor 43 and a second reference position sensor 44. The first reference position sensor 43 senses the occurrence of the first reference position $\theta_{ref1}$ and generates a corresponding output signal (referred to as a first reference signal), while the second reference position sensor 44 senses the occurrence of the second reference position $\theta_{ref2}$ and generates a corresponding output signal (referred to as a second reference signal). The output signals from the reference position sensor 43 and 44 are input to a microcomputer 45, which also receives the shaped POS1 signal from the first interface 41. Based on these input signals, the microcomputer 45 controls the ignition timing of the engine 1 and the start of conducting by the primary winding of an unillustrated ignition coil for the engine.

Figure 12:
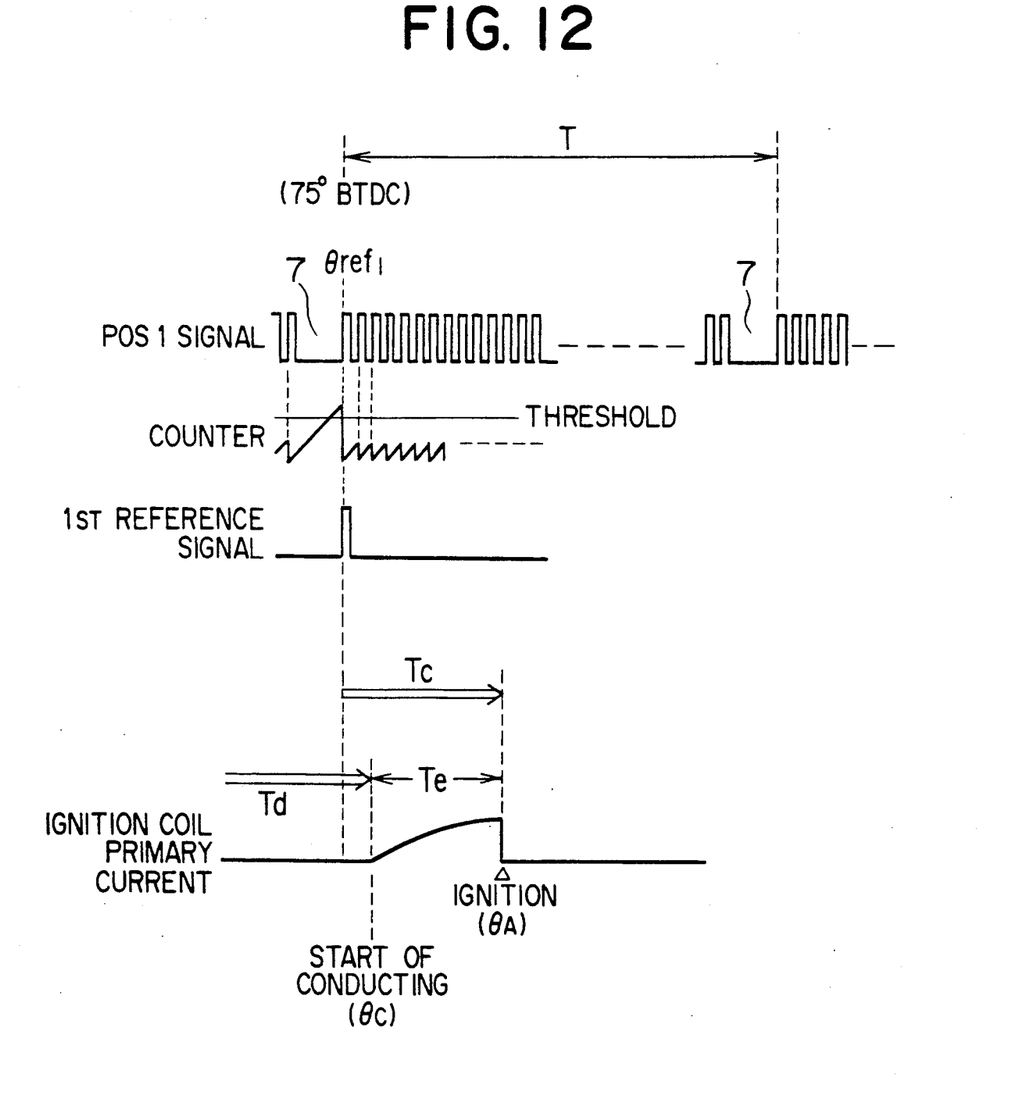
FIG. 12 is a waveform diagram showing the operation of the control unit of FIG. 11.

The operation of this embodiment will be described while referring to the waveform diagrams in FIG. 12, which shows, from top to bottom, the POS1 signal from the first crankshaft position sensor 10, the output of the internal counter in the first reference position sensor 43, the first reference signal generated by the first reference position sensor 43, and the primary winding current of the ignition coil for the engine. The first reference position sensor 43 receives the POS1 signal from the first crankshaft position sensor 10 via the first interface 41, and an internal counter in the first reference position sensor 43 counts clock pulses from an unillustrated clock occurring between the rising edges of consecutive pulses of the POS1 signal. When the count exceeds a predetermined threshold, the first reference position sensor 43 senses the occurrence of the gap 7 in the POS1 signal, and it generates a first reference signal at the rising edge of the pulse immediately following the gap 7. Upon receiving the first reference signal, the microcomputer 45 begins timing for a predetermined length of time Tc corresponding to the number of degrees of crankshaft rotation between the first reference position $\theta_{ref1}$ and a target ignition timing $\theta_A$. If T is the period between consecutive occurrences of the first reference position $\theta_{ref1}$, i.e., the time for the crankshaft to rotate by 180 degrees, and the first reference position $\theta_{ref1}$ is at 75° BTDC, then Tc is expressed as follows:

$$Tc = (75° - \theta_A) \times T/180° \ldots \quad (2)$$

When time period Tc elapses, ignition is carried out by cutting off the primary current in the ignition coil.

In a similar manner, the second reference position sensor 44 receives the POS2 signal from the second crankshaft position sensor 11 and detects the occurrence of the second reference position $\theta_{ref2}$ by measuring the period between consecutive pulses. When the period exceeds a prescribed threshold value, the second reference position sensor 44 provides the microcomputer 45 with a second reference signal, and the microcomputer 45 begins timing for a period Td, which is the length of time from the second reference position $\theta_{ref2}$ until a target crankshaft angle $\theta_C$ at which the ignition coil should start conducting. If T is the period between consecutive occurrences of the first reference position $_{ref1}$, the second reference position $\theta_{ref2}$ is at 5° BTDC, and Te is the length of time for which the ignition coil should conduct before ignition, then Td is expressed by the following formula:

$$Td = [(180° - \theta_A + 5°) \times T/180° - Te \ldots \quad (3)$$

When the microcomputer 45 determines that time Td has elapsed since the second reference position $\theta_{ref2}$, it controls the ignition coil to begin conducting. Since the ignition coil begins conducting before ignition takes place, the period of time Td shown in FIG. 12 is measured from the previous occurrence of the second reference position $\theta_{ref2}$.

In this embodiment, the target ignition timing $\theta_A$ and the start of conducting $\theta_C$ are measured from the first and second reference positions $\theta_{ref1}$ and $\theta_{ref2}$ by timing for periods Tc and Td, respectively, rather than by counting pulses of the POS1 or POS2 signals. This has the advantage that the load on the microcomputer 45 can be decreased compared to an arrangement in which $\theta_A$ and $\theta_C$ are detected by counting pulses from the reference positions.

However, instead of detecting the target ignition timing $\theta_A$ by measuring period of time Tc from the first reference position $\theta_{ref1}$, the microcomputer 45 can detect the crankshaft position corresponding to the target ignition timing in the manner illustrated in FIG. 5, i.e., by counting a prescribed number of pulses of the POS1 signal until the crankshaft has rotated by a prescribed angle $\theta_B$, and then timing for a length of time Ta (Ta < Tc). Such a method is more accurate when the engine rotational speed is fluctuating. The target angle $\theta_C$ for starting conducting of the primary winding of the ignition coil can be detected in a similar manner by a combination of counting pulses and timing for a prescribed length of time.

The embodiment of FIGS. 9-12 may be further equipped with a counter corresponding to the counter of FIG. 7 for identifying prescribed crankshaft angles $\theta_1$ and $\theta_2$ so that the microcomputer 45 can monitor the combustion state and detect misfiring of the engine 1 in the manner described with respect to FIGS. 7–8.

Figure 13:
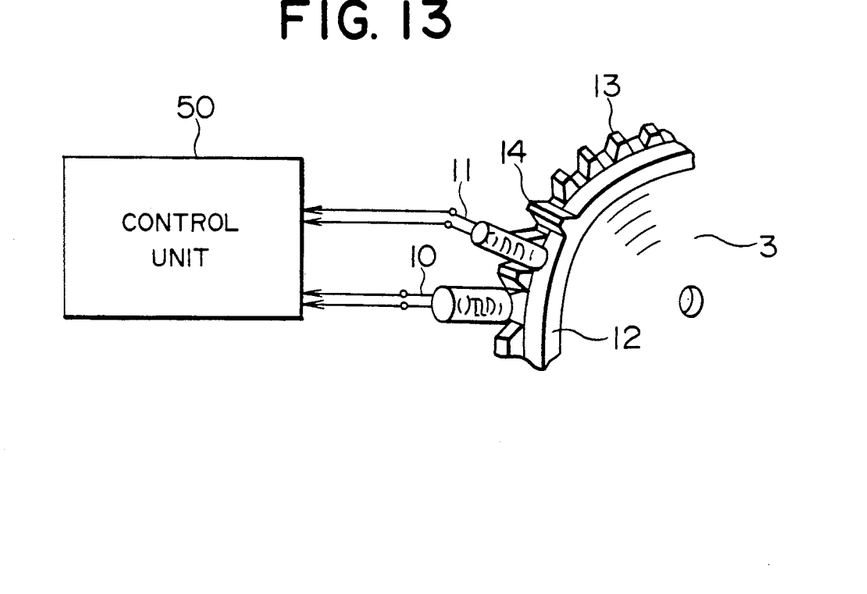
FIG. 13 is a perspective view of a flywheel and crankshaft position sensors of a fourth embodiment of the present invention.

FIG. 13 illustrates a portion of a fourth embodiment of the present invention. As in the previous embodiments, a flywheel 3 mounted on the crankshaft of an unillustrated engine has a ring gear 12 secured to its periphery, but the ring gear 12 of this embodiment is different in structure from the ring gear 4 of the previous embodiments. It comprises a plurality of first teeth 13 having a first thickness (measured in the thickness direction of the ring gear 12) and one or more second teeth 14 having a second thickness larger than the first thickness. The first teeth 13 have a uniform separation in the circumferential direction of the ring gear 12, and the separation between the second teeth 14 and the adjoining first teeth 13 is the same as the separation between adjoining first teeth 13. The number of second teeth 14 is normally selected to equal the number of cylinders which fire in each rotation of an engine, so on a flywheel for a four-cycle, four-cylinder engine, there are two of the second teeth 14. The second teeth 14 are disposed at uniform intervals around the circumference of the ring gear 12.

Figure 14:
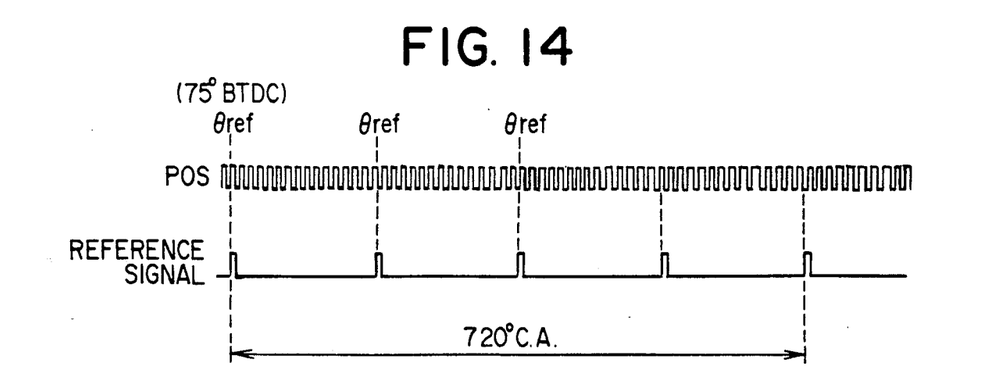
FIG. 14 is a waveform diagram of the output signals of the crankshaft position sensors of FIG. 13.

A first crankshaft position sensor 10 and a second crankshaft position sensor 11 are mounted on the unillustrated engine in the vicinity of the ring gear 12. The first crankshaft position sensor 10 is disposed so as to sense movement of the first teeth 13 and the second teeth 14, and the second crankshaft position sensor 11 is disposed so as to sense movement only of the second teeth 14. When the flywheel 3 is rotated, the crankshaft position sensors 10 and 11 generates output signals like those illustrated in the waveform diagram of FIG. 14. The output signal of the first crankshaft position sensor 10 (referred to as the POS signal) comprises a series of pulses corresponding to the first and second teeth of the ring gear 12. The pulses have a uniform period, such as 2 degrees of crankshaft rotation. The output signal of the second crankshaft position sensor 11 (referred to as the reference signal) comprises a single pulse occurring at regular intervals (once every 180 degrees of crankshaft rotation in the case of a four-cycle, four-cylinder engine). The reference signal is generated each time the crankshaft is at a prescribed reference position, referred to as $\theta_{ref}$. The reference position can be selected as desired, but in the present embodiment it is 75° BTDC.

Figure 15:
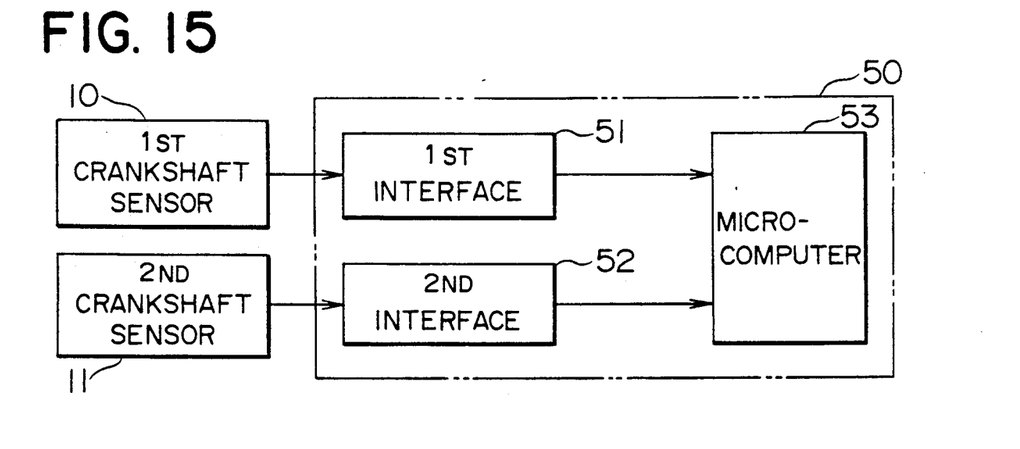
FIG. 15 is a block diagram of the control unit of FIG. 13.

The POS signal and the reference signal from the crankshaft position sensors 10 and 11 are input to a control unit 50. FIG. 15 is a block diagram illustrating the structure of the control unit 50. It includes a first interface 51 which receives the POS signal from the first crankshaft position sensor 10 and a second interface which receives the reference signal from the second crankshaft position sensor 11. The interfaces 51 and 52 perform waveform shaping of the respective input signals and provide the shaped signals to a microcomputer 53. Based on the POS signal and the reference signal, the microcomputer 53 controls the ignition timing of the engine. The structure of this embodiment is otherwise similar to that of the first embodiment.

Figure 16:
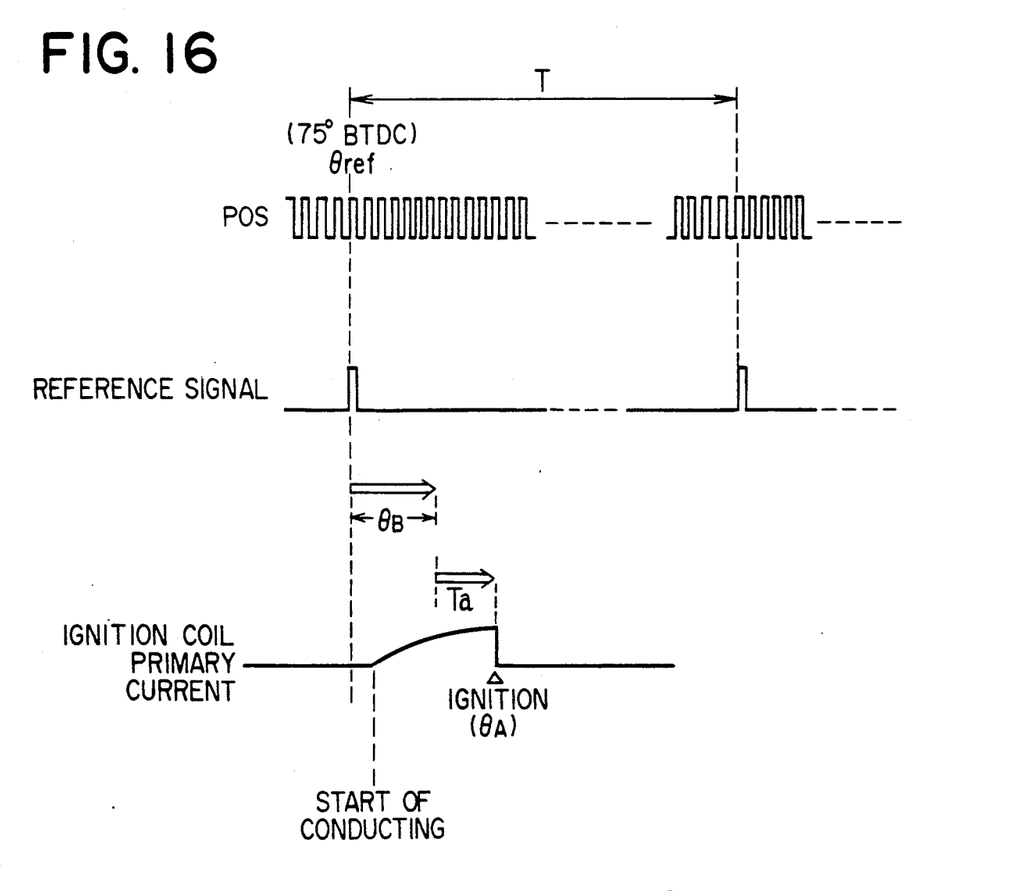
FIG. 16 is a waveform diagram of the operation of the control unit of FIG. 15.

The operation of the control unit 50 will be described while referring to the waveform diagrams in FIG. 16, which illustrates from top to bottom the POS signal from the first crankshaft position sensor 10, the reference signal from the second crankshaft position sensor 11, and the primary winding current of an unillustrated ignition coil for the engine. Upon the rising edge of a pulse of the reference signal, the microcomputer 53 determines that the crankshaft is at the reference position $\theta_{ref}$. The microcomputer 53 then begins counting pulses of the POS signal until the crankshaft of the engine has rotated from the reference position $\theta_{ref}$ by a prescribed angle $\theta_B$. Upon the crankshaft having rotated by angle $\theta_B$, an unillustrated internal timer in the microcomputer 53 then begins timing for a predetermined length of time Ta, calculated by Equation (1). When period Ta elapses, the crankshaft angle is equal to the target ignition timing $\theta_A$, so ignition is carried out by cutting off the primary winding current in an ignition coil, in the same manner as in the preceding embodiments. This embodiment has the advantage that a reference position sensor (like element 22 of FIG. 4) is not necessary, so the circuitry of the control unit 50 can be simplified.

In the drawings for the above-described embodiments, the reference position sensors, the counter of FIG. 7, and the microcomputers are shown as separate components. However, in each of the embodiments, it is possible to incorporate the reference position sensors and the counter into a microcomputer.

What is claimed is:

1. A timing control apparatus for an internal combustion engine comprising:
   first signal generating means for sensing rotation of an engine and generating a first position signal having discontinuous portions at regular intervals, each discontinuous portion corresponding to a first reference position of a crankshaft of the engine;
   reference position sensing means responsive to the first position signal for sensing the occurrence of the first reference position; and
   ignition control means responsive to the reference position sensing means for controlling ignition of the engine based on the first reference position in a manner such that ignition does not occur during the discontinuous portions.

2. A control apparatus as claimed in claim 1 wherein the first position signal comprises a series of pulses having a prescribed separation between consecutive pulses, and the discontinuous portions comprise gaps between consecutive pulses having a width larger than the prescribed separation.

3. A control apparatus as claimed in claim 2 further comprising:
   a counter for counting pulses of the first position signal and generating an angle identifying signal upon having counted a preset number of pulses; and
   setting means responsive to the reference position sensing means for setting the preset number to a first number corresponding to rotation of the crankshaft by a first rotational angle at the occurrence of the first reference position and setting the preset number to a second number corresponding to rotation of the crankshaft by a second rotational angle when the counter has counted the first number of pulses.

4. A control apparatus as claimed in claim 1 wherein the ignition control means comprises:
   a timer;
   means for setting the timer to a period equal to the length of time for the crankshaft to rotate from the first reference position to a target ignition timing; and
   means for performing ignition when the timer has timed for the set period.

5. A control apparatus as claimed in claim 1 further comprising:
    second signal generating means for sensing rotation of the engine and generating a second position signal indicating the occurrence of a second reference position of the crankshaft different from the first reference position; and
    means for controlling the start of conducting of an ignition coil for the engine based on the second reference position.

6. An engine control apparatus for an engine having a crankshaft comprising:
    a first crankshaft position sensor for sensing the rotation of the crankshaft and generating a first position signal comprising a series of pulses having gaps at regular intervals, each of the gaps corresponding to a first reference position of the crankshaft;
    reference position sensing means responsive to the first position signal for sensing the occurrence of the first reference position; and
    timing control means responsive to the reference position sensing means for controlling an ignition timing of the engine,
    wherein the first crankshaft position sensor is mounted on the engine in a position such that ignition of the engine does not occur during any of the gaps in the first position signal.

7. A control apparatus as claimed in claim 6 further comprising:
    a second crankshaft position sensor mounted on the engine for sensing the rotation of the crankshaft and generating a second position signal indicating a second reference position of the crankshaft; and
    conduction control means responsive to the second position signal for controlling the conduction of an ignition coil for the engine based on the second reference position.

* * * * *